United States Patent
Llanos et al.

(10) Patent No.: US 9,037,188 B2
(45) Date of Patent: *May 19, 2015

(54) METHOD AND MOBILE DEVICE FOR OPERATING IN DIFFERENT DATA TRANSFER MODES

(75) Inventors: Edwin Llanos, Kanata (CA); Ming Jian, Kanata (CA); Stewart Morris, Stittsville (CA); Runbo Fu, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 229 days.

This patent is subject to a terminal disclaimer.

(21) Appl. No.: 13/458,652

(22) Filed: Apr. 27, 2012

(65) Prior Publication Data

US 2012/0214558 A1 Aug. 23, 2012

Related U.S. Application Data

(63) Continuation of application No. 12/045,099, filed on Mar. 10, 2008, now Pat. No. 8,190,192, which is a continuation of application No. 11/242,047, filed on Oct. 4, 2005, now Pat. No. 7,346,368.

(51) Int. Cl.
H04M 1/00 (2006.01)
H04W 88/06 (2009.01)
H04W 88/02 (2009.01)
H04W 52/02 (2009.01)

(52) U.S. Cl.
CPC .............. *H04W 88/06* (2013.01); *H04W 88/02* (2013.01); *H04W 52/0293* (2013.01)

(58) Field of Classification Search
CPC ...... H04L 29/06; H04W 84/04; H04W 88/06; H04M 1/72519

USPC ...................... 455/550.1, 552.1, 403; 370/401
See application file for complete search history.

(56) References Cited

U.S. PATENT DOCUMENTS

| | | | |
|---|---|---|---|
| 5,247,575 | A | 9/1993 | Sprague et al. |
| 5,742,637 | A | 4/1998 | Kanterakis et al. |
| 5,742,639 | A | 4/1998 | Fasulo et al. |
| 6,067,583 | A | 5/2000 | Gilbert |
| 6,138,190 | A | 10/2000 | Nordling |

(Continued)

FOREIGN PATENT DOCUMENTS

| | | |
|---|---|---|
| CA | 2561943 C | 11/2010 |
| DE | 602005006420 T2 | 6/2009 |

(Continued)

OTHER PUBLICATIONS

Response to Search and Exam Report dated Jun. 13, 2006 for European Patent Application No. 05 109 163.

(Continued)

*Primary Examiner* — Danh Le
(74) *Attorney, Agent, or Firm* — Fish & Richardson P.C.

(57) ABSTRACT

Various embodiments are described for data communication between a host device and a mobile communication device having two processors. In a first mode of operation, data communication occurs between the host device and a main processor of the mobile device. In a second mode of operation, data communication occurs between the host device and a communications processor of the mobile device. Some of the embodiments also implement power transfer from the host device to the mobile device.

10 Claims, 5 Drawing Sheets

(56) References Cited

U.S. PATENT DOCUMENTS

| | | | |
|---|---|---|---|
| 6,725,061 B1 | 4/2004 | Hutchinson, IV et al. | |
| 7,088,965 B1 | 8/2006 | Ngan | |
| 7,116,645 B2 * | 10/2006 | Morvan et al. | 370/278 |
| 7,346,368 B2 | 3/2008 | Llanos et al. | |
| 7,408,944 B2 * | 8/2008 | Zhang et al. | 370/401 |
| 8,190,192 B2 | 5/2012 | Llanos et al. | |
| 2001/0006336 A1 | 7/2001 | Yi et al. | |
| 2002/0032027 A1 | 3/2002 | Kirani et al. | |
| 2003/0035525 A1 * | 2/2003 | Wu et al. | 379/114.1 |
| 2003/0167345 A1 | 9/2003 | Knight et al. | |
| 2004/0053602 A1 | 3/2004 | Wurzburg | |
| 2004/0166895 A1 | 8/2004 | Koenck et al. | |
| 2005/0245298 A1 | 11/2005 | Mori | |
| 2006/0125446 A1 * | 6/2006 | Tupman et al. | 320/132 |
| 2007/0150634 A1 | 6/2007 | Chiba | |
| 2007/0174500 A1 | 7/2007 | Kim et al. | |
| 2007/0183807 A1 | 8/2007 | Park et al. | |
| 2008/0153542 A1 | 6/2008 | Llanos et al. | |

FOREIGN PATENT DOCUMENTS

| | | |
|---|---|---|
| EP | 0 861 009 A2 | 8/1998 |
| EP | 1 487 081 A2 | 12/2004 |
| EP | 1 773 038 B1 | 4/2007 |

OTHER PUBLICATIONS

Certificate of Grant for European Patent No. 1773038, dated Apr. 30, 2008.

Communication under Rule 51(4) (Notice of Acceptance) for European Patent Application No. 05 109 163, dated Aug. 10, 2007.

Notice of Allowance for U.S. Appl. No. 11/242,047, dated Oct. 26, 2007.

Office Action for U.S. Appl. No. 12/045,099, dated Mar. 1, 2011.

Office Action Response for U.S. Appl. No. 12/045,099, dated May 20, 2011.

Office Action for U.S. Appl. No. 12/045,099, dated Aug. 15, 2011.

Office Action Response for U.S. Appl. No. 12/045,099, dated Nov. 15, 2011.

Notice of Allowance for U.S. Appl. No. 12/045,099, dated Feb. 3, 2012.

Co-pending U.S. Appl. No. 12/045,099, "Method and Mobile Device for Operating in Different Data Transfer Modes", filed on Mar. 10, 2008.

Ju, "High-performance analog switches . . . ", Fairchild Semiconductor, South Portland, ME, Feb. 2004, http://www.electronicproducts.com/print.asp?ArticleURL=FAIRCHILD.feb2004.html.

Extended European Search Report for corresponding EP Patent Application No. 05 10 9163 dated Mar. 20, 2006.

Decision to Grant for corresponding EP Patent Application No. 05 10 9163 dated Mar. 4, 2008.

Canadian Notice of Allowance dated Feb. 19, 2010, Canadian Patent Application No. 2,561,943.

Wong, Jerry; Pericom Semiconductor Corporation, Application Brief #46 Mobile (MP3, Cell phone, PDA, PMP)USB switch mobile phone http://www.pericom.com/pdf/applications/AB046.pdf dated Sep. 13, 2004.

English abstract for DE602005006420; published on Jun. 4, 2009 and retrieved on Jan. 13, 2015.

* cited by examiner

METHOD AND MOBILE DEVICE FOR OPERATING IN DIFFERENT DATA TRANSFER MODES

CROSS-REFERENCE TO RELATED APPLICATION

This application is a continuation of U.S. patent application Ser. No. 12/045,099, filed Mar. 10, 2008, which is a continuation of U.S. patent application Ser. No. 11/242,047, filed Oct. 4, 2005. Patent application Ser. No. 11/242,047 issued to patent as U.S. Pat. No. 7,346,368. Patent application Ser. No. 12/045,099 issued to patent as U.S. Pat. No. 8,190,192. The entire contents of U.S. application Ser. No. 12/045,099 and U.S. patent application Ser. No. 11/242,047, are hereby incorporated by reference.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

FIELD

The embodiments described herein relate to at least one of maintaining data communication and/or power transfer between a mobile device and a host device during different modes of operation.

BACKGROUND

Some peripheral devices, such as mobile wireless devices or personal data assistants, have a wireless communication module that can receive data from a host device, via a wired connection, and then transmit the data wirelessly. Conversely, these peripheral devices can also receive wireless data and transmit the data to the host device via the wired connection. However, in current implementations, one processor typically routes the data between the host device and the wireless communication module. This results in inefficient data transfer when there is a large amount of data that needs to be transferred between the wireless communication module and the host device.

In some instances, another additional issue to consider is providing power to the peripheral devices. These peripheral devices can be powered by internal means, such as an internal battery pack, as well as by external means, such as by connection to an AC power outlet or to the host device. Typically, the internal battery pack acts as a power supply and when the internal battery pack needs charging, the peripheral device can be connected to the host device to receive a charging current. In some cases, charging needs to be considered when data is being transferred between the wireless communication module and the host device.

BRIEF DESCRIPTION OF THE DRAWINGS

For a better understanding of the embodiments described herein and to show more clearly how they may be carried into effect, reference will now be made, by way of example only, to the accompanying drawings which show the exemplary embodiments and in which:

FIG. 3 is a block diagram of an exemplary embodiment of a node of a wireless network that the mobile communications device of FIG. 1 may communicate with;

Figure 1:
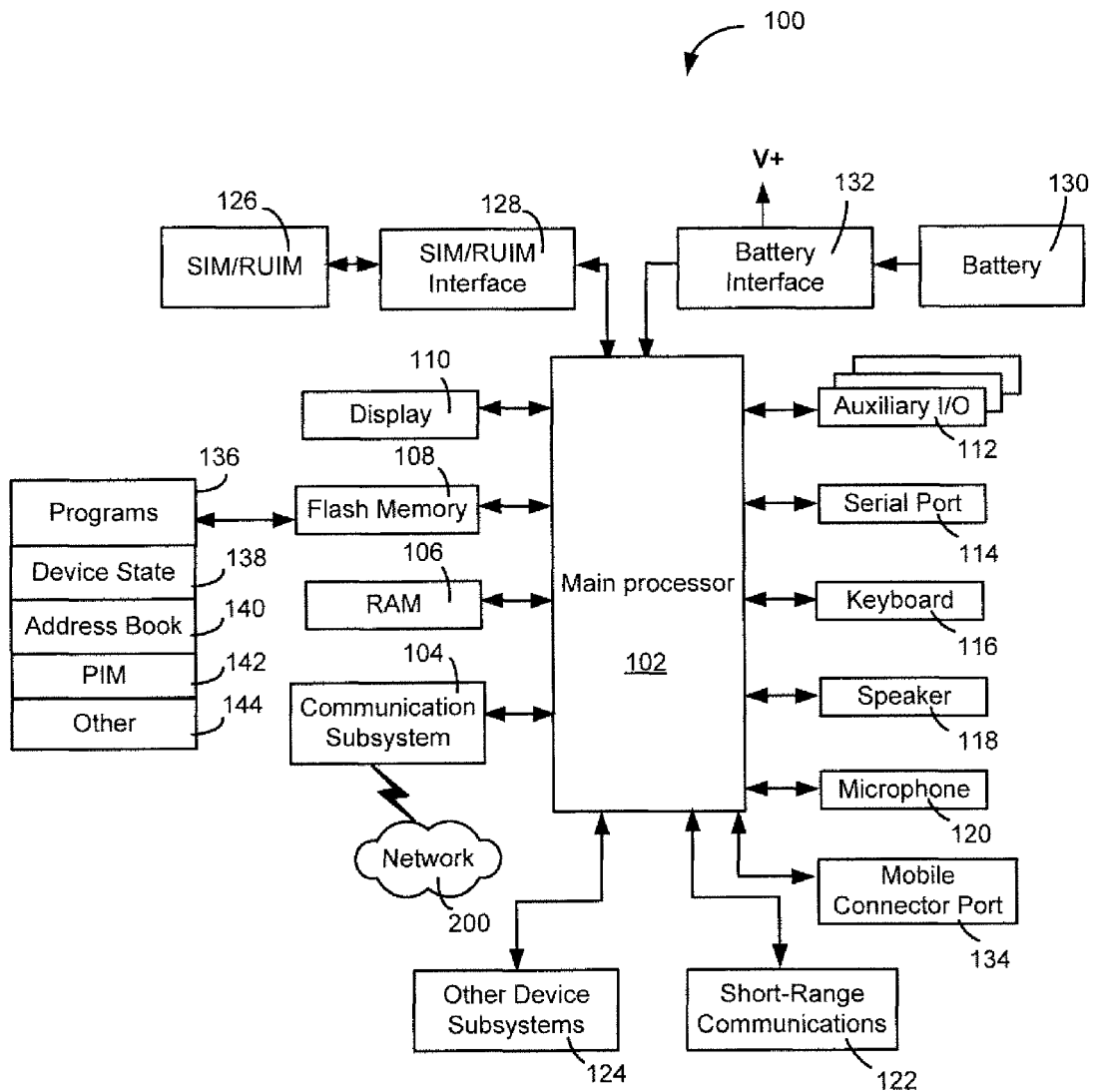
FIG. 1 is a block diagram of an exemplary embodiment of a mobile communication device.

These and other features of the exemplary embodiments are described in more detail below.

DESCRIPTION

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments described herein generally have applicability in the field of data communication for mobile communication devices that are connectable to a host device via a wired connection and have two or more processors that can communicate with the host device at different data speeds. Some of the embodiments described herein are also applicable to mobile communication devices that can be recharged via the wired connection. To facilitate an understanding, the embodiments will be described in terms of wireless communication for a mobile wireless communication device that has a main processor and a wireless communication module having a communication processor. The mobile wireless communication device transmits and receives data from a host device through a connector port at different speeds depending on which processor is communicating with the host device. Examples of mobile communication devices include cellular phones, cellular smart-phones, wireless organizers, personal digital assistants, handheld wireless communication devices, wirelessly enabled notebook computers and the like.

Some of the embodiments make use of a mobile communication device, hereafter referred to as a mobile device, that is a two-way communication device with advanced data communication capabilities having the capability to communicate in a wireless or wired fashion with other computing devices. The mobile device may also include the capability for voice communications. Depending on the functionality provided by the mobile device, it may be referred to as a data messaging device, a cellular telephone with data messaging capabilities, a wireless Internet appliance, or a data communication device (with or without telephony capabilities). The mobile device communicates with other devices through a network of transceiver stations.

Referring first to FIG. 1, shown therein is a block diagram of a mobile device 100 in one exemplary implementation. The mobile device 100 comprises a number of components, the controlling component being a main processor 102 which controls the overall operation of mobile device 100. Communication functions, including data and voice communications, are performed through a communication subsystem 104. The communication subsystem 104 receives messages from and sends messages to a wireless network 200. In some implementations of the mobile device 100, the communication subsystem 104 is configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), and Intelligent Digital Enhanced Network (iDEN™) standards. New standards are still being defined, but it is believed that they will have similarities to the network behavior described herein, and it will be understood by persons skilled in the art that the embodiments described herein can use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in some implementations, other wireless networks can also be associated with the mobile device 100 in other implementations. The different types of wireless networks that can be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, iDEN networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a serial port 114, a keyboard 116, a speaker 118, a microphone 120, short-range communications 122, other device subsystems 124, and a mobile connector port 134 that includes data lines for data transfer in some embodiments, as well a supply line for charging the mobile device 100 in other embodiments. In some embodiments, the mobile connector port 134 can be a USB or a FIREWIRE port.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the main processor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after required network registration or activation procedures have been completed. Network access is associated with a subscriber or user of the mobile device 100. To identify a subscriber, the mobile device 100 may require a SIM/RUIM card 126 (i.e. Subscriber Identity Module or a Removable User Identity Module) to be inserted into a SIM/RUIM interface 128 in order to communicate with a network. Accordingly, the SIM card/RUIM 126 and the SIM/RUIM interface 128 are entirely optional.

The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, Short Message Service (SMS), and Multimedia Messaging Services (MMS). More advanced services can include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. The battery interface 132 is coupled to a regulator (not shown), which assists the battery 130 in providing power V+ to the mobile device 100. Although current technology makes use of a battery, future technologies such as micro fuel cells can provide the power to the mobile device 100. In some embodiments, the supply line of the connector port 134 can be connected to the battery interface 132 to provide a charging current to charge the battery 130.

The main processor 102, in addition to its operating system functions, enables execution of software applications 136 on the mobile device 100. The subset of software applications 136 that control basic device operations, including data and voice communication applications, will normally be installed on the mobile device 100 during its manufacture.

The mobile device 100 further includes a device state module 138, an address book 140, a Personal Information Manager (PIM) 142, and other modules 144. The device state module 138 can provide persistence, i.e. the device state module 138 ensures that important device data is stored in persistent memory, such as the flash memory 108, so that the data is not lost when the mobile device 100 is turned off or loses power. The address book 140 can provide information for a list of contacts for the user. For a given contact in the address book, the information can include the name, phone number, work address and email address of the contact, among other information. The other modules 144 can include a configuration module (not shown) as well as other modules that can be used in conjunction with the SIM/RUIM interface 128.

The PIM 142 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the serial port 114, the short-range communications subsystem 122, any other suitable device subsystem 124 or the mobile connector port 134. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The serial port 114 or the mobile connector port 134 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication standards include those developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
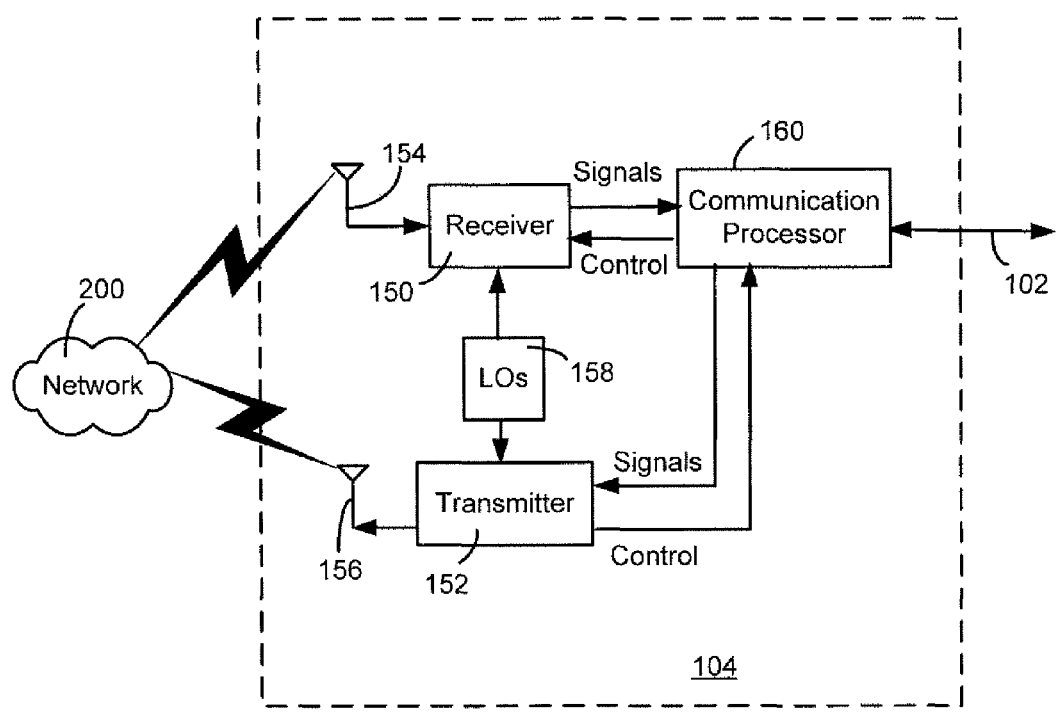
FIG. 2 is a block diagram of an exemplary embodiment of a communication subsystem component of the mobile communication device of FIG. 1.

Referring now to FIG. 2, a block diagram of an exemplary embodiment of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a communications processor 160 for wireless communication. The communications processor 160 can be a Digital Signal Processor (DSP). As will be apparent to those skilled in the field of communications, the particular design of the communication subsystem 104 can depend on the communication network with which the mobile device 100 is intended to operate. Thus, it should be understood that the design illustrated in FIG. 2 serves only as an example.

Signals received by the antenna 154 through the wireless network 200 are input to the receiver 150, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor 160. In a similar manner, signals to be transmitted are processed, including modulation and encoding, by the communications processor 160. These processed signals are input to the transmitter 152 for digital-to-analog (D/A) conversion, frequency up conversion, filtering, amplification and transmission over the wireless network 200 via the antenna 156. The communications processor 160 not only processes communication signals, but also provides for receiver and transmitter control. For example, the gains applied to communication signals in the receiver 150 and transmitter 152 can be adaptively controlled through automatic gain control algorithms implemented in the communications processor 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is sending to the wireless network 200 and is otherwise turned off to conserve resources. Similarly, the receiver 150 is periodically turned off to conserve power until it is needed to receive signals or information (if at all) during designated time periods.

Figure 3:
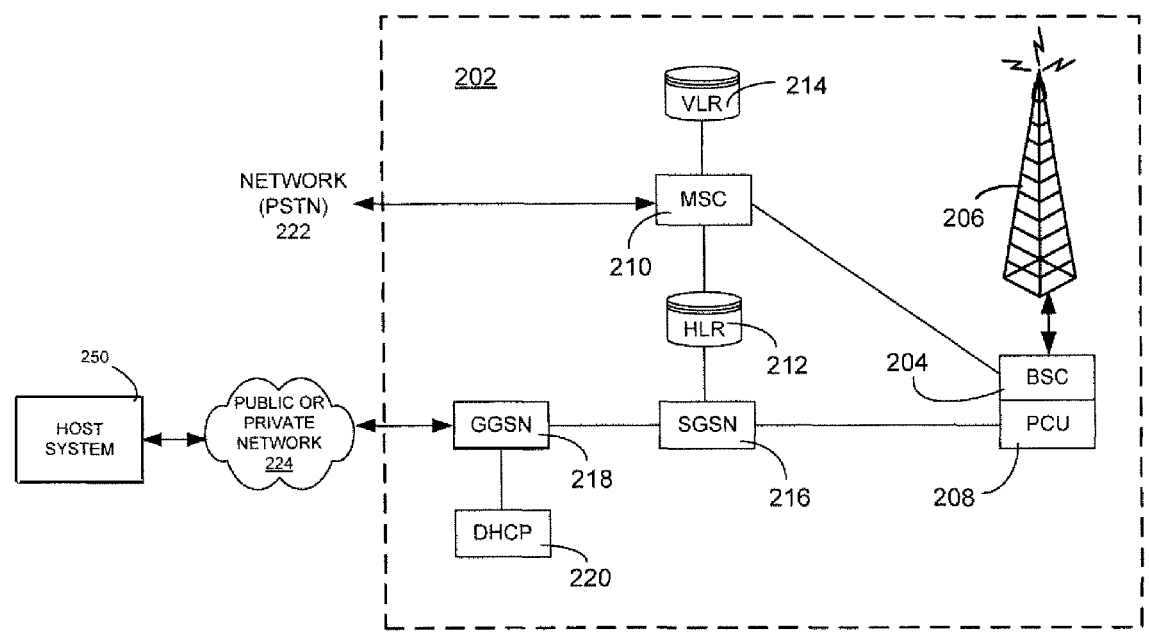

Referring now to FIG. 3, a block diagram of an exemplary embodiment of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that can be used in communications through the wireless network 200.

In a GSM network, the MSC 210 is coupled to the BSC 204 and to a landline network, such as a Public Switched Telephone Network (PSTN) 222 to satisfy circuit switching requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
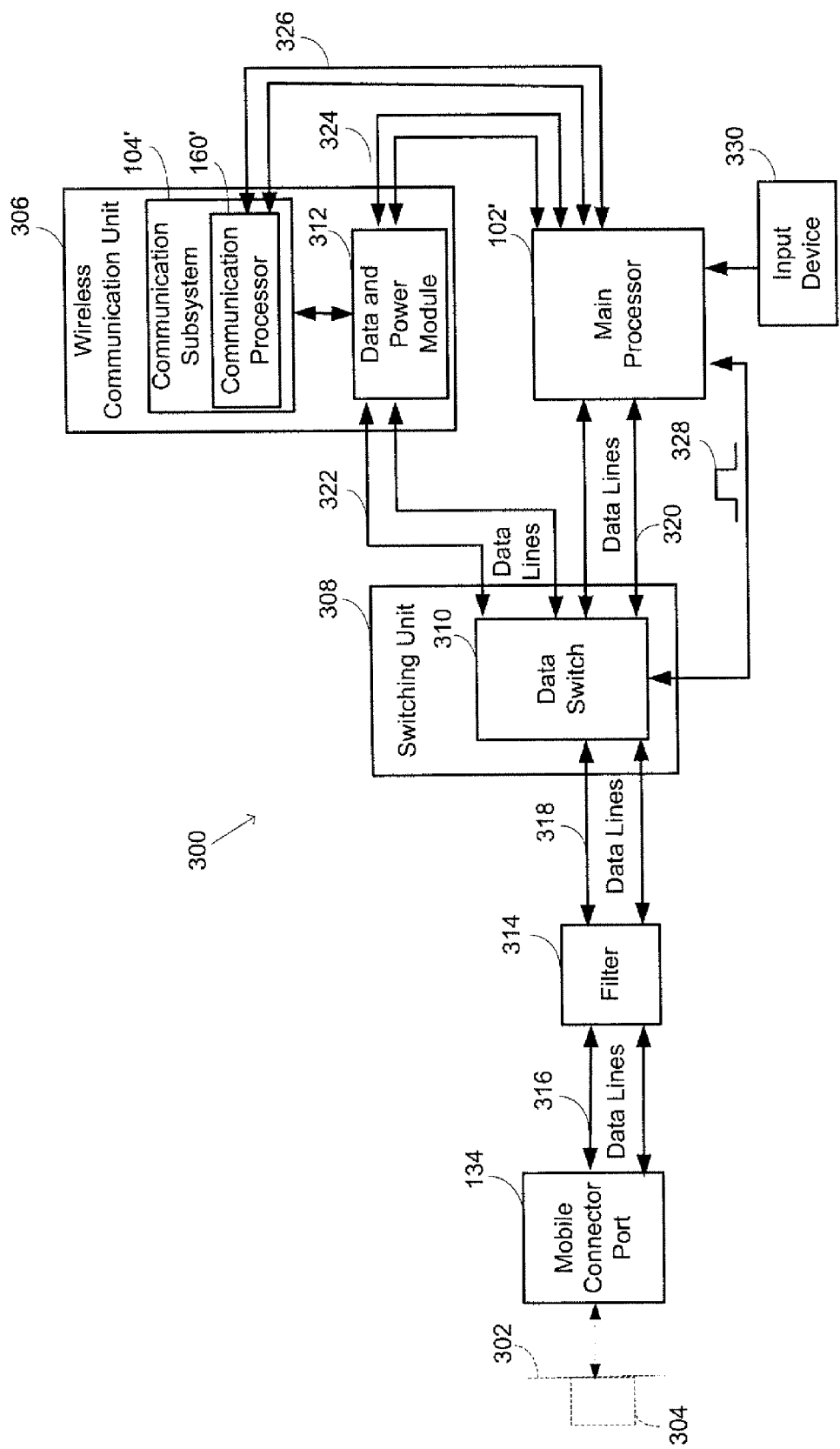
FIG. 4 is a block diagram of an exemplary embodiment of a portion of a mobile communication device that includes several processors selectively connectable with a host device for data transmission at different rates depending on a mode of operation; and, FIG. 5 is a block diagram of another exemplary embodiment of a portion of a mobile communication device that includes several processors selectively connectable with a host device for data transmission at different rates depending on a mode of operation and provides charging in either operation mode.

Referring now to FIG. 4, shown therein is a block diagram of an exemplary embodiment of a portion of a mobile communication device 300. The mobile device 300 includes two or more processors that are selectively connectable with a host device 302 having a host connector port 304 for data transmission at different rates depending on the mode of operation. The mobile device 300 is similar to the mobile device 100 and includes a main processor 102', a wireless communication unit 306, a switching unit 308 having a data switch 310, and the mobile connector port 134. The wireless communication unit 306 includes a communication subsystem 104' having a communication processor 160'. The wireless communication unit 306 may also include a data and power module 312. The data and power module 312 is optional and in some embodiments, the functionality provided by the data and power module 312 can be provided by one of the processors 102' and 160' or by some other means. The data and power module 312 can act as a transceiver so that the host device 302 is connected to the communication processor 160' through the data and power module 312. The communication subsystem 104' and communication processor 160' are similar to those described for mobile device 100 but have added functionality as described below.

The mobile connector port 134 is connectable to the host device 302 via the host connector port 304. Accordingly, the connector ports 134 and 304 correspond to one another and operate under a data transfer protocol that is supported by the main processor 102', the communication processor 160' and the host device 302.

In some instances, the mobile device 300 may further include a filter 314 connecting the switching unit 308 to the mobile connector port 134. The filter 314 is optional and can generally be used to reduce electromagnetic interference generated by the mobile device 300. In some embodiments, the filter 314 may be located between main processor 102' and the switching unit 308.

In this example, the mobile connector port 134 includes a first set of data lines 316 that are connected to the filter 314. A second set of data lines 318 connect the filter 314 to the data switch 310 (if the filter 314 is not present then there is one set of data lines from the connector port 134 to the data switch 310). Third and fourth sets of data lines 320 and 322 connect the data switch 310 to the main processor 102' and the data and power module 312 respectively. The data and power module 312, if used, also transfers data to and from the communication processor 160'. The data lines 322 can also go to the communication processor 160' directly. The third and fourth sets of data lines 320 and 322 allow the data switch 310 to selectively send data to or receive data from the main processor 102' and the data and power module 312 (or directly to the communication processor 160') respectively. In some embodiments, the data switch 310 can transmit data at different transmission rates with minimal signal distortion for either rate.

Data transfer between the mobile device 300 and the host device 302 depends on the mode of operation of the mobile device 300. One mode of operation is normal operation mode in which data can be transferred between the host device 302 and the main processor 102' via the data switch 310. Another mode of operation is wireless modem operation mode in which data can be transferred directly between the host device 302 and the communication processor 160' via the data switch 310. In the wireless modem operation mode, the mobile device 300 can more efficiently transmit data directly between the host device 302 and the wireless communication unit 306 rather than having to transmit data through the main processor 102'. In some embodiments, data transfer in the normal operation mode occurs at a first data rate and data transfer in the wireless modem operation mode occurs at a second data transfer rate.

In some embodiments, the second data transfer rate can be higher than the first data transfer rate. This allows for faster data transfer between the host device 302 and the wireless communication unit 306 when a large amount of wireless communication data is sent or received by the wireless communication unit 306. For example, wireless communication data can be transferred from the host device 302 to the wireless communication unit 306 for conversion to electro-magnetic signals for wireless transmission. In this case, the wireless modem operation mode allows the mobile device 300 to be used as a high-speed wireless modem. The converse is also true in which electro-magnetic signals are received, converted to wireless communication data and sent to the host device 302 from the wireless communication unit 306.

To coordinate data transfer during the various modes of operation, the main processor 102' is connected to the data and power module 312 and the communication processor 160' via control and status lines 324 and 326 respectively. The control and status lines 324 and 326 are communications links that can include a number of communication lines for transferring a number according to a certain protocol. In some implementations, the control and status lines 324 and 326 can be RS232 communication lines such as the RS232 TX and RTS signal lines. In some implementations, a bidirectional data line can be used with appropriate general-purpose input/output pins on the main and communication processors 102' and 160'. In some implementations, the communication subsystem 104' and the data and power module 312 can be connected by a primary peripheral interface line and the control and status data lines 324 can be a secondary peripheral interface. Further, in some embodiments, the data and power module 312 and the status and control lines 324 are not present, the data lines 322 go directly to the communication processor 160' and the status and control lines 326 are used for inter-processor communication between the main processor 102' and the communication processor 160'.

The main processor 102' and communication processor 160' also execute software programs (not shown) that facilitate communication with each other and the handoff of data transfer with the host device 302 as described in more detail below. The software executed by the main processor 102' also generates an operation mode signal 328 which is provided to the data switch 310 to indicate the current mode of operation. One of the main and communication processors 102' and 160' acts as a master and coordinates the operation of these software programs.

During use, the default mode of operation can be the normal operation mode. In this case, the operation mode signal 328 configures the data switch 310 to connect the data lines 318 to the data lines 320. The host device 302 will sense that the mobile communication device 300 is attached to the host connector port 304 and then use the appropriate drivers associated with the main processor 102' to facilitate data transfer between the host device 302 and the main processor 102'. The main processor 102' then communicates with the host device 302 via connector ports 134 and 304 to indicate that data should be transmitted to the main processor 102' at the appropriate data rate. At the same time, the main processor 102' communicates via control and status lines 324 and 326 with the communication processor 160' to indicate that the current mode of operation is the normal operation mode. It should be understood that in the following description, in embodiments which do not include the data and power module 312, the functionality provided by the data and power module 312 can be provided by the communication processor 160'.

When the mode of operation switches to wireless modem operation mode, the main processor 102' sends a command to the communication processor 160' to indicate that the mode of operation is switching to the wireless modem operation mode. In some implementations, the main processor 102' can indicate this by sending a radio application layer protocol (RALP™) command to the communication processor 160'. The data and power module 312 then waits for data lines 318 to be connected to data lines 322 by the data switch 310. This occurs after the main processor 102' sets the operation mode signal 328 to indicate wireless modem operation mode. The data and power module 312 can then provide a signal on the data lines 322 to the host device 302 to indicate that the wireless communication unit 306 is connected to the host device 302. The host device 302 can then begin a series of steps to properly communicate with the data and power module 312 and acknowledge that data transfer will occur. This can include loading appropriate driver software.

Prior to the connection of the communication processor 160' to the host device 302, the main processor 102' can send an appropriate signal over the data lines 320 to notify the host device 302 that the current data transmission link with the main processor 102' is to be dropped. The main processor 102' can then indicate to the user of the device 300 that the current mode of operation is the wireless modem operation mode. This can be done via the display 110.

At this time, the main processor 102 can query internal battery information for the mobile device 300 such as battery voltage, battery temperature, and the like, for example, from the data and power module 312 via the control and status lines 324. In some embodiments, during the wireless modem operation mode, the data and power module 312 can also provide power to the components of the communication subsystem 104'.

In some embodiments, when the mode of operation switches from wireless modem operation mode to normal operation mode, the main processor 102' can send a signal via the control and status lines 326 to the communication processor 160' to request connection to the data lines 318. This can include using the control and status lines 326 to provide an interrupt signal to the communication processor 160'. The communication processor 160' can then send appropriate signals over the data lines 322 to notify the host device 302 that the current data connection is to be discontinued. At the same time, the main processor 102' can try to re-establish the processor link with the communication processor 160'. The main processor 102' can set the operation mode signal 328 to indicate that the current mode of operation is the normal operation mode. The data switch 310 then connects the data lines 318 to the data lines 320. The main processor 102' can then renegotiate a data link with the host device 302 if the host device 302 is still connected to the mobile device 100 or once the next data insertion occurs. The main processor 102' and communication processor 160' then operate in normal operation mode.

The mobile communication device 300 can also include an input device 330 that can be utilized by the user of the device 300 to configure the mode of operation. The input device 330 can be the keyboard 116, or an appropriate device on the auxiliary I/O 112. This can include a touch display, a scroll wheel input, and the like. Control can also be provided by a voice command that is spoken into the microphone 120 by the user.

Figure 5:
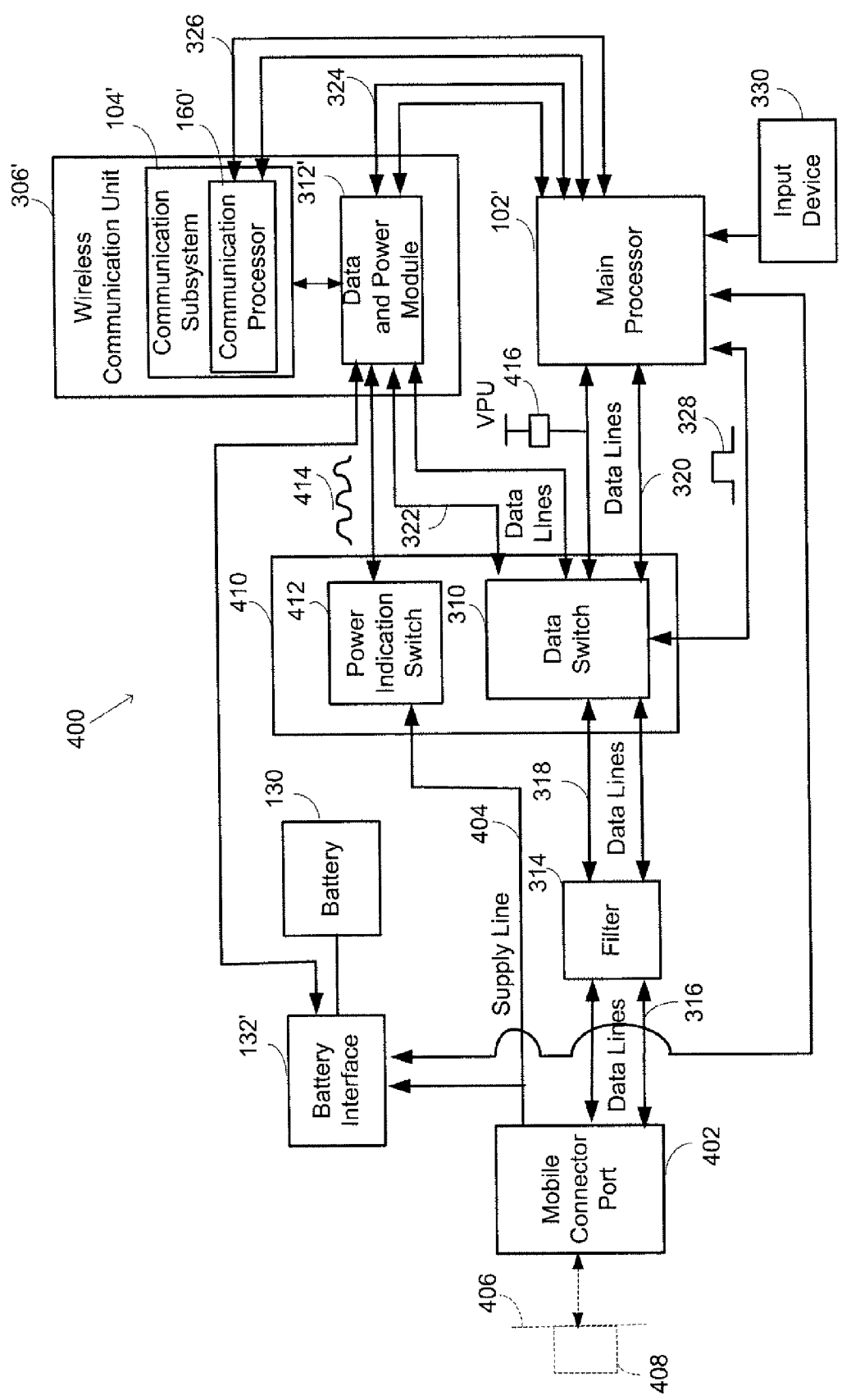

Referring now to FIG. 5, shown therein is a block diagram of another exemplary embodiment of a portion of a mobile communication device 400. The mobile device 400 includes several processors that are selectively connectable with a host device 406 for data transmission at different rates depending on a mode of operation. The mobile communication device 400 also includes structure and functionality for enabling battery charging in either mode of operation.

The mobile communication device 400 includes a mobile connector port 402 with data lines 316 and a supply line 404. The mobile connector port 402 engages a corresponding host connector port 408 on the host device 406 having data and supply lines (both not shown). When the mobile connector port 402 is connected to the host connector port 408, after appropriate synchronization and initialization between the host device 406 and the mobile device 400, the supply line 404 can provide a charging current to charge the mobile device 400.

The mobile device 400 includes a switching unit 410 having a power indication switch 412 and the data switch 310. The supply line 404 is connected to a battery interface 132' which is in turn connected to the battery 130. The supply line 404 is also connected to the power indication switch 412. The power indication switch 412 provides a supply indication signal 414 to the data and power module 312' to indicate that the mobile connector port 402 is connected to the host connector port 408 and that the supply line 404 can provide a charging current to the battery interface 132' during the wireless modem operation mode. The battery interface 132' can also be connected to the data and power module 312'. This allows the data and power module 312' to read various data associated with the battery 130.

The switching unit 410 can switch the data line connections between the main processor 102' and the communication processor 160' (via the data and power module 312'), so that the host device 406 can directly communicate with the communication processor 160' during wireless modem operation mode. At same time the switching unit 410 can allow battery charging in both operation modes with appropriate communication between the two processors 102' and 160' and the host device 406 as is described in further detail below.

In some implementations, the power indication switch 412 can include two transistors that preferably have very low ON resistance and a high drain current (>1.9 A) to reduce any voltage drops associated with the power indication switch 412. The transistors can be field effect transistors and in some cases can be the FDG6321c Dual channel FET provided by Fairchild Semiconductor, South Portland, USA. Further, in some implementations, the data switch 310 can be a high bandwidth analog switch having a bandwidth greater than 350 MHz and a very low on resistance (<4.5 ohms). In some cases, the data switch 310 can be the NLAS4717 analog switch available from Fairchild Semiconductor.

In some implementations, the connector ports 402 and 408 can be USB ports and associated device driver software is installed on both the host device 406 and the mobile device 400 to establish and manage data and power connections between these devices according to USB standards. USB ports, under the USB 2.0 standard, include data lines that can provide data at several speeds including 1.5, 12 and 480 Mbits/sec and power lines that can provide a charging current of up to 500 mA at 5 V. The data lines can be twisted pairs of data cables that collectively use half-duplex differential signaling to combat the effects of electromagnetic noise on longer lines. In USB implementations, the data lines 316-322 can also be twisted pairs of data cables represented by D+ and D− (not shown).

The USB standard involves enumeration in which, once the mobile device 400 is connected to the host port 408, the host device 406 queries the mobile device 400, loads the necessary device drivers (if not already loaded), and assigns a unique address to the mobile device 400. The host device 406 also queries the mobile device 400 to determine the required data transfer rate and the power requirements. To determine the data rate and power requirements, the host device 406 interacts with the main processor 102' during normal operation mode and with the communication processor 160' during wireless modem operation mode.

To determine whether the mobile device 400 is connected to the host connector port 408, the mobile device 400 can also include a pull-up resistor 416 connected to the data lines 320 which indicates that the main processor 102' is connected to the host device 406. The pull-up resistor 416 can have a resistance on the order of 1.5 kΩ. The data and power module 312' can also include a similar pull-up resistor (not shown) for the same reason. When the data lines 320 associated with the main processor 102' or the data lines 322 associated with the communication processor 160' are to be connected to the data lines of the host device 406, the corresponding pull-up resistor is connected to the data lines 320 or 322 to bring the data lines high, enabling the host device 406 to detect that a device is attached. These pull-up resistors can be connected to either the D+ or D− line to indicate that data transfer rate occurs at a certain rate.

The operation of the mobile device 400 in normal and wireless operation modes is similar to that of mobile device 300 with respect to data transfer. However, mobile device 400 also provides battery charging functionality. The operation mode signal 328 controls both the data switch 310 and the power indication switch 412.

In normal operation mode, the operation mode signal 328 configures the data switch 310 to connect the data lines 320 to the data lines 318 and also configures the power indication switch 412 to set the supply indication signal 414 to inform the data and power module 312' that a possible connection with a port that can supply power has been made. Appropriate data transactions between the host device 406 and one of the processors 102' and 160' then have to occur to confirm USB interface connection. Once USB enumeration has been completed, the supply line 404 can provide the charging current to the battery 130 through the battery interface 132' under the control of the main processor 102'. The main processor 102' can be connected to the battery interface 132' to control the charging of the battery 130.

When the mode of operation is switched from normal operation mode to wireless modem operation mode, the main processor 102' performs the steps as previously described above for the mobile device 300 along with some additional steps. Assuming that there was a connection between the main processor 102' and the host device 406, the main processor 102', via the pull-up resistor 416, provides a low signal on the data lines 320 to notify the host device 406 that the current data link is to be dropped. If the battery 130 was also being charged, then the main processor 102' sends a control signal to the battery interface 132' to disable the charging before dropping the power link with the host device 406. The main processor 102' can then set the operation mode signal 328 to indicate that the mode is wireless modem operation mode. The main processor 102' can communicate with the battery interface 132' or the data and power module 312' to obtain information on the battery 130.

At this point, the wireless communication processor 160' can negotiate a connection with the host device 406. The data and power module 312' includes a pull up resistor (not shown) so that it can send an appropriate signal over the data lines 322 to begin enumeration for a new data connection with the host device 406. As part of the enumeration process, the host device 406 recognizes that connection with a new processor will occur and loads the appropriate device drivers.

In wireless modem operation mode, the operation mode signal 328 configures the data switch 310 to connect the data lines 322 to the data lines 318 and also configures the power indication switch 412 to set the supply indication signal 414 to indicate that the supply line 404 is able to provide a charging current to the battery 130 through the battery interface 132'. The communication processor 160' can then negotiate a suitable amount for the charging current provided by the host connector port 408 of the host device 406. The communication processor 160' can then set a CHARGING_ON status indication to the main processor 102' via the control and status lines 326. The main processor 102' can then send appropriate command signals to the battery interface 132' to charge the battery 130. In some embodiments, the charging can be done at different rates, such as 100, 370 and 500 mA for example. Further, in some embodiments, to save power, the data and power module 312' may contain power sources, such as a low dropout voltage regulator, that can be used to power certain components of the communication subsystem 104'.

If the mobile connector port 402 is disconnected from the host connector port 408 during the wireless modem operation mode, the communication processor 160' can notify the main processor 102' of the removal of the charging current on the supply line 404. This can be done by de-asserting CHARGING_ON status indication via the control and status lines 326. The main processor 102' can then provide an appropriate control signal to the battery interface 132' to indicate that current charging of the battery 130 has ended.

When the mode of operation is to be switched from wireless modem operation mode to the normal operation mode, a similar series of steps as those previously described for the mobile device 300 can be followed. For instance, at the beginning of the transition to the normal operation mode, assuming that the battery 130 was being charged in wireless modem operation mode, the main processor 102' can disable the charging by providing an appropriate control signal to the battery interface 132'. After the main processor 102' informs the communication processor 160' of the change in operation mode via the control and status lines 326, the data and power module 312' can pull the data lines 312 low via its internal pull-up resistor to notify the host device 406 that the current data link is to be dropped. The main processor 102' can then renegotiate a data and power link with the host device 406 assuming that the mobile device 400 is still connected to the host device 406.

In one aspect, at least one embodiment described herein provides a mobile communication device comprising a main processor for controlling the operation of the mobile communication device; a wireless communication unit connected to the main processor, the wireless communication unit having a communication processor and being adapted to send and receive electromagnetic waves corresponding to wireless communication data; a mobile connector port connectable to a host device, the mobile connector port including data lines to provide data communication between the mobile wireless communication device and the host device; and, a switching unit connected to the mobile connector port, the main processor and the wireless communication unit, the switching unit including a data switch, wherein the data switch routes data between the host device and the main processor during a normal operation mode, and the data switch routes data between the host device and the wireless communication unit during a wireless modem operation mode.

In some embodiments, the wireless communication unit includes a data and power module that manages data transfer and supply power for the wireless communication unit, the data and power module being connected to the data switch for transferring the wireless communication data; and, a communication subsystem connected to the data and power module for transferring the wireless communication data and converting between the wireless communication data and the corresponding electromagnetic waves. Both the data and power module and the communication processor are connected to the main processor for coordinating transitions between the normal and wireless modem operation modes.

In some embodiments, the communication processor is connected to the data switch for transfer of the wireless communication data. The communication processor is also connected to the main processor for coordinating transitions between the normal and wireless modem operation modes, and the wireless communication unit includes a communication subsystem for transfer of the wireless communication data and conversion between the wireless communication data and the corresponding electromagnetic waves, the communication subsystem being controlled by the communication processor.

In some embodiments, the mobile connector port further includes a supply line to receive a charging current from the host device, the switching unit further includes a power indication switch, and the mobile communication device further includes a battery interface connected to the supply line, and an internal battery connected to the battery interface to provide power to the mobile communication device.

In some embodiments, during both the normal and wireless modem operation modes, the supply line can provide the charging current to the internal battery for charging when the mobile communication device is connected to the host device, and during the wireless modem operation mode the power indication switch provides a supply voltage indication signal to the wireless communication unit to indicate host connection and charging availability.

In some embodiments, the main processor is connected to the battery interface to control charging of the internal battery; and during the wireless operation mode, the communication processor sends a signal to the main processor indicating that the supply line is providing the charging current to the battery interface.

In some embodiments, the data switch transfers data between the host device and the main processor at a first data rate during the normal operation mode and the data switch transfers data between the host device and the wireless communication unit at a second data rate during the wireless modem operation mode where the second data rate is higher than the first data rate.

In some embodiments, the mobile communication device further comprises an input device to allow a user to select between the normal operation mode and the wireless modem operation mode.

In some embodiments, the input device is one of a keyboard, a touch sensitive screen, a microphone, a touch pad and a roller wheel.

In some embodiments, the mobile communication device further includes a filter connected to the mobile connector port to reduce electromagnetic interference generated by the mobile communication device.

In another aspect, at least one embodiment described herein provides a method for data communication between a host device and a mobile communication device, wherein the mobile communication device includes a main processor and a wireless communication unit having a communication processor, the main processor controls the operation of the mobile communication device, and the wireless communication unit sends and receives electromagnetic waves corresponding to wireless communication data. The method comprises:

a) providing a switching unit having a data switch for selectively connecting the host device to one of the main processor and the communication processor;

b) configuring the data switch to provide a first data connection between the host device and the main processor when the mobile communication device operates in a normal operation mode; and, c) configuring the data switch to provide a second data connection between the host device and the communication unit when the mobile communication device operates in a wireless modem operation mode.

In some embodiments, the method further includes providing a connection between the wireless communication unit and the main processor for coordinating transitions between the normal and wireless modem operation modes.

In some embodiments, the mobile communication device further includes a supply line for receiving a charging current from the host device, a battery interface connected to the supply line and an internal battery connected to the battery interface to provide power to the mobile communications device, and the method further includes providing the switching unit with a power indication switch to provide a supply voltage indication signal to the wireless communication unit to indicate host connection and charging availability during the wireless modem operation mode.

In some embodiments, the communication processor sends a signal to the main processor indicating that the supply line is providing the charging current to the battery interface.

In some embodiments, the method includes transferring data between the host device and the main processor at a first data rate during the normal operation mode and transferring data between the host device and the wireless communication processor at a second data rate during the wireless modem operation mode where the second data rate is higher than the first data rate.

In some embodiments, the method further includes providing an input device to allow a user to select between the normal operation mode and the wireless modem operation mode.

In some embodiments, the method further includes providing at least one of a keyboard, a touch sensitive screen, a microphone, a touch pad and a roller wheel for the input device.

In some embodiments, the method includes connecting a filter to the data switch to reduce electromagnetic interference generated by the mobile communication device.

It should be understood that various modifications can be made to the embodiments described and illustrated herein, without departing from the embodiments, the general scope of which is defined in the appended claims.

The invention claimed is:

1. A mobile communication device comprising:
 a main processor adapted to control the operation of the mobile communication device;
 a communication processor adapted to control reception and transmission of wireless communication data;
 a mobile connector port adapted to connect a host device to the mobile communication device; and
 a switching unit configured to selectively allow data communication via the mobile connector port between the host device and the main processor at a first data transfer rate or between the host device and the communication processor at a second data transfer rate different from the first data transfer rate.

2. The mobile communication device of claim 1, wherein the mobile communication device further comprises:
 a supply line configured to receive a charging current from the host device;
 a battery configured to provide power to the mobile communication device; and
 a battery interface connected to the supply line and the battery,
wherein the supply line is configured to provide the charging current to the battery for charging during data communication between the host device and the main processor.

3. The mobile communication device of claim 2, wherein the switching unit is configured to transfer data between the host device and the main processor during a normal operation mode at the first data transfer rate and the data switch is configured to transfer data between the host device and the communication processor during a wireless modem operation mode at the second data transfer rate and wherein the second data transfer rate is higher than the first data transfer rate.

4. The mobile communication device of claim 3, wherein during both operation modes the supply line is configured to provide the charging current to the battery for charging when the mobile communication device is connected to the host device, and during the wireless modem operation mode the switching unit is configured to provide a supply voltage indication signal to the communication processor to indicate host connection and charging availability.

5. The mobile communication device of claim 3, wherein the main processor is connected to the battery interface to control charging of the battery; and during the wireless modem operation mode the communication processer is configured to send a signal to the main processor to indicate that the supply line is providing the charging current to the battery interface.

6. The mobile communication device of claim 3, wherein the mobile communication device further comprises an input device to allow a user to select between the normal operation mode and the wireless modem operation mode.

7. The mobile communication device of claim 1, wherein the communication processor and the main processor are adapted to communicate with one another and the switching unit to coordinate data communication with the host device.

8. The mobile communication device of claim 7, wherein the main processor is adapted to send an operation mode signal to the switching unit to coordinate data communication with the host device.

9. The mobile communication device of claim 7, wherein the host device is adapted to communicate with one of the main processor and the communication processor to determine data transfer rate and power requirements.

10. The mobile communication device of claim 1, wherein the mobile connector port is a Universal Serial Bus port.

* * * * *